(12) United States Patent
Chen

(10) Patent No.: US 7,404,297 B2
(45) Date of Patent: Jul. 29, 2008

(54) AIR CONDITIONER WITH A LIGHT WAVE UNIT FOR AUXILIARY HEATING AND STERILIZING

(75) Inventor: Jincong Chen, Guangdong (CN)

(73) Assignee: Guangdong Galanz Enterprises Co., Ltd., Foshan (CN)

( * ) Notice: Subject to any disclaimer, the term of this patent is extended or adjusted under 35 U.S.C. 154(b) by 442 days.

(21) Appl. No.: 10/547,474

(22) PCT Filed: Feb. 19, 2004

(86) PCT No.: PCT/CN2004/000131

§ 371 (c)(1),
(2), (4) Date: Aug. 30, 2005

(87) PCT Pub. No.: WO2004/079272

PCT Pub. Date: Sep. 16, 2004

(65) Prior Publication Data

US 2006/0254297 A1    Nov. 16, 2006

(30) Foreign Application Priority Data

Mar. 6, 2003  (CN) ............................... 03 2 24002
Dec. 8, 2003  (CN) ........................ 2003 2 0118952

(51) Int. Cl.
*F25D 17/02* (2006.01)
(52) U.S. Cl. .......................................... 62/64; 62/264
(58) Field of Classification Search ...................... 62/64, 62/78, 264
See application file for complete search history.

(56) References Cited

U.S. PATENT DOCUMENTS

| 4,317,041 A | * | 2/1982 | Schenck ...................... 250/435 |
| 4,490,982 A | * | 1/1985 | Christmas ...................... 62/3.2 |
| 4,838,032 A | * | 6/1989 | Maslaney et al. .............. 62/3.7 |

FOREIGN PATENT DOCUMENTS

| CN | 2319732 | 5/1999 |
| CN | 2407271 | 1/2000 |
| CN | 00212539.0 | 8/2001 |

(Continued)

*Primary Examiner*—Melvin Jones
(74) *Attorney, Agent, or Firm*—Ping Wang; Morris, Manning & Martin, LLP

(57) ABSTRACT

An air conditioner having a light wave unit for auxiliary heating and sterilizing is provided, which comprises a conventional air conditioner including a filter (8), an evaporator (5), a cross-flow fan (6) and a motor (9). The light wave unit includes a light wave tube (2), a temperature sensor (4) and a controller (7). The light wave tube is provided between the evaporator (5) and the cross-flow fan (6), the temperature sensor (4) is mounted on the evaporator (5), and an input port of the controller (7) is coupled to a signal output port of the temperature sensor (4) while an output port of the controller (7) is coupled to a power input port of the light wave tube (2). The advantage of the air conditioner is that the light wave tube is provided to fulfill an auxiliary heating and sterilizing operation. The air conditioner can overcome not only the defects with an ultraviolet unit in the art that are harmful to a human body and causes materials to be aged, but also the defects with an ozone unit in the art that will generate ozone pollution and a high-voltage. The air conditioner is friendly to the environment and convenient for users.

13 Claims, 4 Drawing Sheets

FOREIGN PATENT DOCUMENTS

| | | |
|---|---|---|
| CN | 2441064 | 8/2001 |
| CN | 2443270 | 8/2001 |
| CN | 00219199.7 | 11/2002 |
| JP | 4-151472 | 5/1992 |
| JP | 2000-255257 | 9/2000 |
| JP | 2000 289449 | 10/2000 |

* cited by examiner

AIR CONDITIONER WITH A LIGHT WAVE UNIT FOR AUXILIARY HEATING AND STERILIZING

CROSS-REFERENCE TO RELATED APPLICATIONS

This application is the entry into the U.S. National Stage of PCT Application No. PCT/CN2004/000131, filed Feb. 19, 2004, the disclosure of which is hereby incorporated by reference.

BACKGROUND OF THE INVENTION

1. Field of the Invention

The present invention relates to an air conditioner, and more particular to an air conditioner with a light wave unit for auxiliary heating and sterilizing. The air conditioner according to the present invention can effectively kill bacteria on an evaporator thereof, discharge clean air and distribute heat upon the requirement by a light wave emitted from a light wave tube of the light wave unit. Therefore, the present invention belongs to the technical field of air conditioner devices.

2. Description of the Prior Art

An air conditioner is a device for regulating a temperature and humidity of air in the environment. As a heat-exchanging unit, an evaporator of the air conditioner is exposed to air, and its surface is always kept in moist. As a result, the surface of the evaporator is prone to accumulate dusts and bacteria that will propagate well. During operation of the air conditioner, the bacteria will be discharged out of the air conditioner to pollute the environment.

In order to eliminate bacteria in the air conditioner, an ultraviolet unit is provided in the prior art such as Chinese Patent No. 00212539.0 with a title of "Antibacterial Air Conditioner". Moreover, an ozone unit for eliminating bacteria is provided in Chinese Patent No. 00219199.7 entitled "Devices for Circularly Sterilizing Air flow Using Ozone". Although the prior art can provide sterilized air, there exist the following disadvantages.

The disadvantages of an air conditioner with the ultraviolet unit in the art are as follows: (1) Ultraviolet rays can damage the chromosome of animals. As a result, though it can be used to eliminate bacteria, it also gives rise to a risk for human being because it could result in cataracts, skin diseases, eyes damages, and premature aging of the skin in animals. Therefore, ultraviolet shield means is necessarily provided for such an air conditioner to prevent ultraviolet rays from harming other animals. (2) Since only bacteria directly exposed to ultraviolet rays can be eliminated, the air conditioner in the art can be effective to a part of bacteria located therein. (3) The exposure to ultraviolet rays may cause materials aged, which will affect the life and appearance of the air conditioner itself.

The disadvantages of an air conditioner having the ozone unit in the art are as follows: (1) Ozone is a pungent gas having strong oxidizability which can be used to eliminate bacteria. However, a high concentration of ozone (more than 1.5 ppm) can make animals irritation of throat and eyes, shortness of breath, deterioration of lung, which is harmful to people. Moreover, nowadays ozone has been limited to use by the Rules or Regulations. (2) A high frequency and high voltage power is usually required to generate ozone by electrolyzing air. As a result, the air conditioner with an ozone unit is of a high voltage power of from about 1000 volt to 10000 volt, which will lead to electrical leakage. (3) A poisonous gas, $NO_2$, is typically created during operation of an ozone generator. (4) An ozone recycle unit is required in the air conditioner with an ozone unit, which renders the air conditioner costly and complex.

In addition, a conventional air conditioner employs a heating tube or an electrically heating wire to fulfill an auxiliary heating function. In this way, heat exchanging is carried out when air flow passes over the surface of the heating tube or the electrically heating wire. Although this conventional means may be effective in auxiliary heating, there exist the following disadvantages: (1) The heating tube or the electrically heating wire is a conductor of electricity which tends to lead to an electric shock. (2) During heating operation, a concentration of heat on the surface of the heating tube or the electrically heating wire will cause a high temperature, which readily causes inner parts of the air conditioner, especially plastic parts, deformed.

SUMMARY OF THE INVENTION

The present invention is to provide an air conditioner having a light wave unit for auxiliary heating and sterilizing. The present invention is therefore provided to solve the technical problems of: (1) overcoming the defects in the air conditioner with an ultraviolet unit, harming a human body and causing materials thereof aged; (2) overcoming the defects in the air conditioner with an ozone unit, generating ozone pollution and a high-voltage; (3) overcoming the defects in the air conditioner with a heating tube or an electrically wire causing a uneven air flow and an electric shock.

In order to overcome the problems mentioned above, according to an embodiment of the present invention, an air conditioner having a light wave unit for auxiliary heating and sterilizing comprises a conventional air conditioner including a filer, an evaporator, a cross-flow fan and a motor, characterized in that the light wave unit comprises a light wave tube, a temperature sensor having a signal output port, and a controller having an input portion. The light wave tube is provided between the evaporator and the cross-flow fan, the temperature sensor is mounted on the evaporator, and the input port of the controller is coupled to the signal output port of the temperature sensor while the output port of the controller is coupled to a power input port of the light wave tube.

In order to achieve the object and overcome the problems mentioned above, another embodiment of the present invention is disclosed as follows:

The light wave tube in the invention is replaced by an infrared tube. That is, the light wave unit comprises a temperature sensor, a controller, and an infrared tube. The infrared tube is provided between an evaporator and a cross-flow fan, the temperature sensor is mounted on the evaporator, and an input port of the controller is coupled to a signal output port of the temperature sensor while an output port of the controller is coupled to a power input port of the infrared tube.

To improve efficiency of the light wave tube, in one embodiment of the invention, a reflector is provided close to the light wave tube. The reflector is preferably in an arced or a round shape, of which the center directly faces to the light wave tube. A temperature sensor having a signal output port coupled to the input port of the controller is disposed at a back of the reflector.

The controller of the present invention comprises a microprocessor MCU, and a transistor Q1, a relay TR2, resistors R13, R4, R9, and a capacitor C8, which are coupled to I/O ports of the UCU; the transistor Q1, the relay TR2, and the resistor R13 compose a driving circuit having an input port coupled to an I/O port of the MCU, and an output port coupled to the light wave tube. Two signal output ports of the two aforementioned temperature sensors are coupled to I/O ports of the MCU, respectively.

The MCU may be a multifunctional microprocessor, such as one with the type: TMP87PH46N.

The controller may be optionally configured to be an automatic mode or a manual mode, thereby controlling the air conditioner to automatically or manually sterilize the evaporator. The controller is configured to detect and protect the disinfecting operation, by controlling the temperature of the surface of the reflector and the evaporator within the preset temperature range.

The air conditioner of the present invention contains the advantages as follows:

1. A prominent advantage of the invention is that a light wave tube is employed to carry out the auxiliary heating and sterilizing operation. (1) The heat generated from the light wave tube can be congregated to a bacteria-propagated place by the reflector so as to eliminate the bacteria. Consequently, the present invention overcomes not only the drawbacks existing in the air conditioner having an ultraviolet unit in the art that are harmful to a human body and cause materials aged, but also those in the air conditioner having an ozone unit generating ozone pollution and high-voltage danger. The air conditioner of the present invention therefore is convenient to operate. (2) The air conditioner of the present invention further overcomes the defects of the air conditioner having a heating tube or an electric wire that lead an electric shock, cause an uneven air flow, and even cause inner parts of the air conditioner, especially plastic parts, on fire.

2. According to the present invention, not only the bacteria directly exposed to a light wave radiation but also those escaped from such a direct exposure can be eliminated. Moreover, the air conditioner of the present invention, which does not need an ozone recycle unit, is of a simple structure, inexpensive to manufacture, convenient to use, and exhibits high efficiency.

3. The light wave tube according to the present invention can emit a light wave in a specific direction to assist an evaporator of the air conditioner to warm up air. When air lows over the evaporator, a direct heat exchange between air and the evaporator is carried out, and then the heated air is discharged out of the air conditioner.

4. According to the present invention, the light wave tube can generate a light wave having a broad range of spectrum. Therefore, firstly, the light wave having various spectrums can be used to eliminate bacteria; secondly, the visible light contains a relatively high reflectivity and thereby can be converged by a reflector, which in turn enhances energy efficiency; thirdly, the light wave can be used to eliminate various microbes and protozoans.

DETAILED DESCRIPTION OF THE INVENTION

Figure 2:
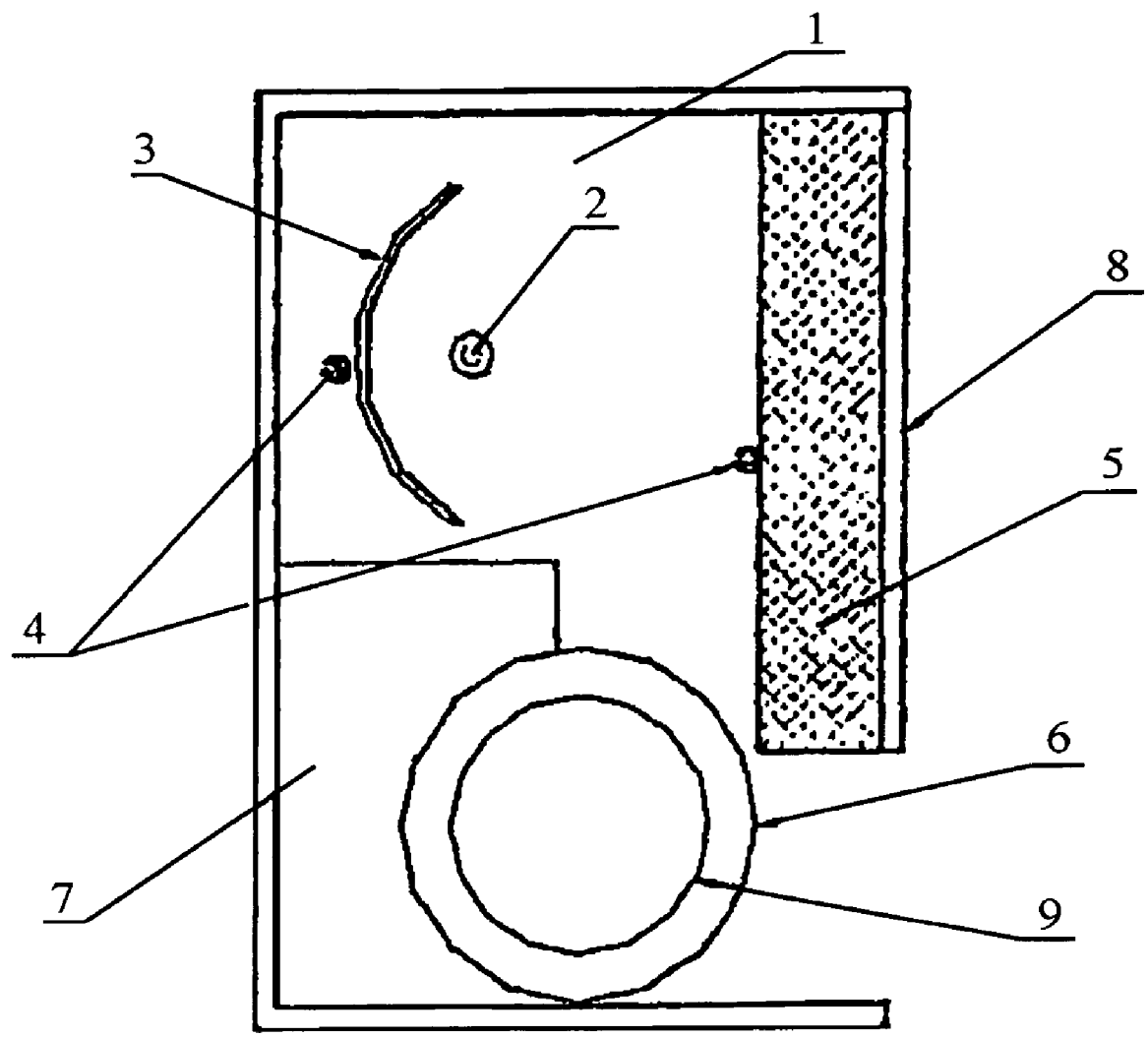
FIG. 2 is a partially sectional view of an air conditioner with a light wave unit for auxiliary heating and sterilizing.
Figure 3:
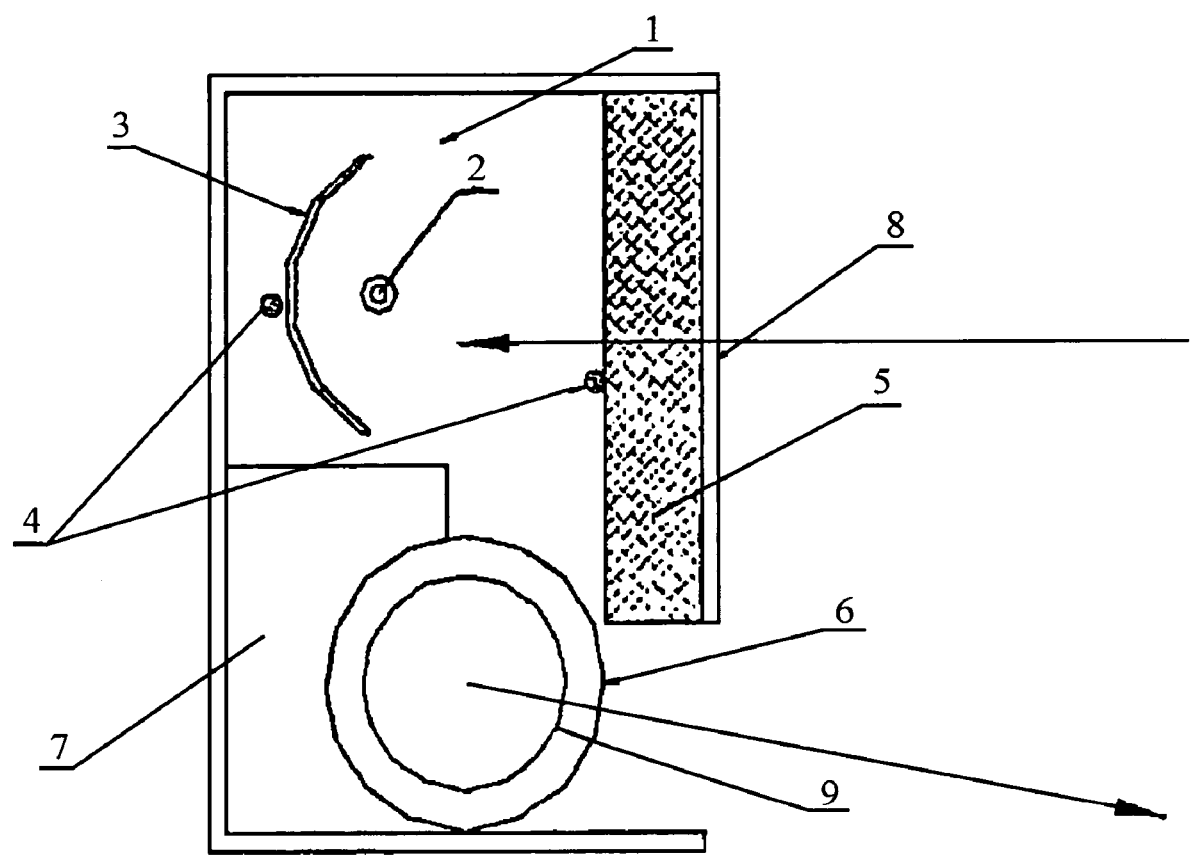
FIG. 3 is a schematic view showing a direction of air flow in the air conditioner.
Figure 4:
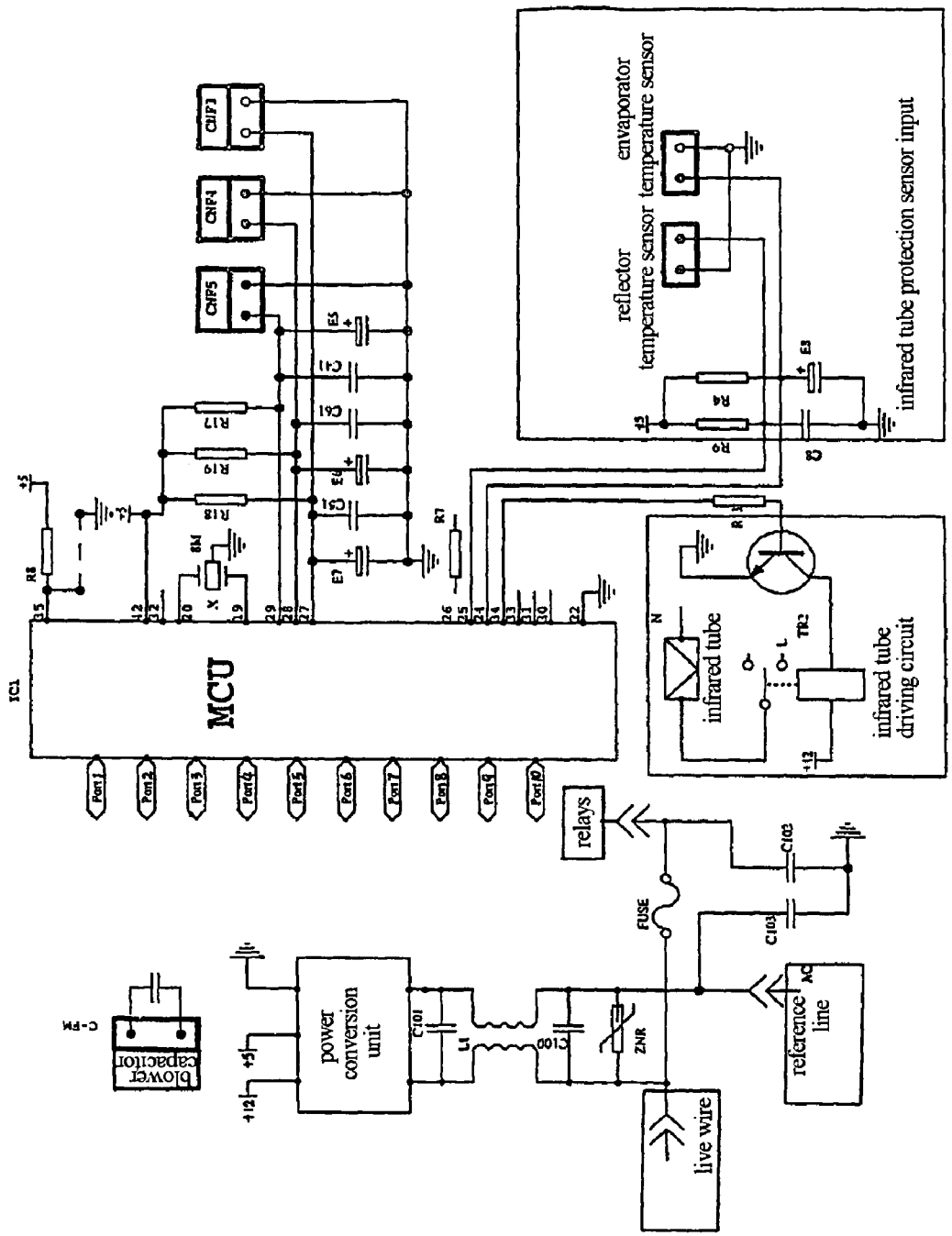
FIG. 4 is an electric circuit diagram of one embodiment of the present invention.

An embodiment of the present invention is provided as shown in FIGS. 2-4. In FIG. 2, the embodiment includes a conventional air conditioner 1 and a light wave unit for auxiliary heating and sterilizing. The conventional air conditioner 1 comprises a filter 8, an evaporator 5, a cross-flow fan 6, and a motor 9. The light wave unit comprises a light wave tube 2, temperature sensors 4 and a controller 7. The light wave tube 2 is provided between the evaporator 5 and the cross-flow fan 6, a reflector 3 is located close to the light wave tube 2, the temperature sensors 4 are respectively mounted to a surface of the evaporator and a back surface of the reflector, and two input ports of the controller 7 are respectively coupled to signal output ports of the temperature sensors 4 while an output port of the controller 7 is coupled to a power input port of the light wave tube 2.

As illustrated in FIG. 4, the controller 7 comprises a microprocessor MCU, and a transistor Q1, a relay TR2, resistors R13, R4, R9, and a capacitor C8, which are coupled to the UCU, in which the base of the transistor Q1 is coupled to an I/O port of the MCU through a resistor R13, and the collector of the transistor Q1 is coupled to a power input port of the light wave tube 2 through the relay TR2, and the transistor Q1, the relay TR2 and the resistor R13 compose a driving circuit. Two I/O ports of the MCU are respectively coupled to signal input ports of the two temperature sensors 4. The MCU that is configured to control the light wave tube 2, the temperature sensors 4 as well as other parts of the air conditioner, constitutes a central control unit of the air conditioner. The MCU is a multifunctional microprocessor with a type of TMP87PH46N in this embodiment. The MCU (IC1) is configured to receive a remote input signal via Port 1, couple to a signal input port of a key via Port 2, couple to a control port of a step motor via Port 3, couple to a control port of an indoor blower via Port 4, couple to a control port of a outdoor blower (not shown) via Port 5, couple to a control port of a compressor via Port 6, couple to a control port of a four-way valve via Port 7, couple to a control port of a buzzer via Port 8, couple to a control port of a indicator light via Port 9, and couple to an output port of a reset circuit via Port 10. An inner disk is coupled to a pin 27 of the MCU (IC1) through a CNF3, an outer disk is coupled to a pin 28 of the MCU through a CNF4, and an indoor air conditioner is coupled to a pin 29 of the MCU through a CNF5.

According to this embodiment of the present invention, in order to improve the auxiliary heating effect that the light wave tube 2 acts on the evaporator 5, the reflector 3 in an arced or a round shape, like a reflecting mantle, with a center directly facing to the light wave tube 2 is provided to cover the light wave tube, so as to converge heat generated from the light wave tube onto the evaporator. The temperature sensor 4 having a signal output port coupled to an input port of the controller 7 is disposed at the back surface of the reflector 3. A temperature is preset for the controller 7 so that the controller 7 can control the temperature of the air conditioner within the preset temperature range. The light wave tube 2 is a light wave tube which can emit a visible light, having a heat-resistant power of 810 watt, 1000 watt, 1200 watt or 1500 watt.

The principle of this embodiment of the present invention is described as follows. The light wave tube 2 is initiated under control of the controller 7. The light wave emitted from the light wave tube 2 is reflected to a surface of the evaporator 5 by the reflector 3, so as to realize the auxiliary heating and sterilizing effect that the light wave tube 2 acts onto the evaporator 5. When the temperature sensors 4 detect that the temperature of the back surface of the reflector 3 or the surface of the evaporator 5 reaches the preset temperature, the MCU provides an indication to shut down the light wave tube 2. In the meantime, the motor 9 drives the cross-flow fan 6 to rotate under the control of the controller 7, so as to generate a negative pressure inside the air conditioner to thereby circulate air. Air outside the air conditioner is flown into the inner cavity of the air conditioner through the filter 8 and the evaporator 5. When air is flown across the evaporator, because the temperature of air is lower than that of the surface of the evaporator, heat exchange between air and the evaporator occurs so that the temperature of air increases. Then, the sterilized heated air is discharged through an air outlet to hereby fulfill auxiliary heating and sterilizing function of the light wave.

A start-up disinfection key and a stop disinfection key are provided on an operation board of the air conditioner or a remote controller. When the disinfecting function is initiated, the microprocessor MCU transmits a relevant indication to stop the operation of the compressor, the indoor motor and the outdoor motor, and simultaneously starts the light wave tube 2. The light wave tube 2 emits a light wave such as an infrared light, which is converged onto the surface of the evaporator 5 by the reflection of the reflector 3. As a result, the temperature of the surface of the evaporator 5 is increased. When the temperature reaches 60-80° C., it is capable of killing bacteria on the surface of the evaporator and destroying the environment of the growth of the bacteria. Consequently, clean air can be discharged out of the air conditioner according to the present invention.

The controller 7 may be optionally configured to be in an automatic mode or a manual mode, and thus control the air conditioner to automatically or manually disinfect the evaporator.

A second embodiment of the present invention includes: an infrared tube replacing the light wave tube 2 of the light wave unit in the above embodiment. Thus, the light wave unit comprises a temperature sensor 4, a controller 7, and an infrared tube 2. The infrared tube is provided between an evaporator 5 and a cross-flow fan 6, the temperature sensor 4 is mounted on the evaporator 5, and an input port of the controller 7 is coupled to a signal output port of the temperature sensor 4 while an output port of the controller 7 is coupled to a power input port of the infrared tube 2. According to this embodiment, in order to improve the auxiliary heating effect that the infrared tube 2 acts on the evaporator 5, the reflector 3 in an arced or a round shape is provided. The controller 7 may be configured to be in an automatic mode or a manual mode, and thus control the air conditioner to automatically or manually auxiliary heat the evaporator 5. The controller 7 is set to monitor the heating operation and to control the temperature of the surface of the reflector and of the surface of the evaporator within the preset temperature range.

Figure 1:
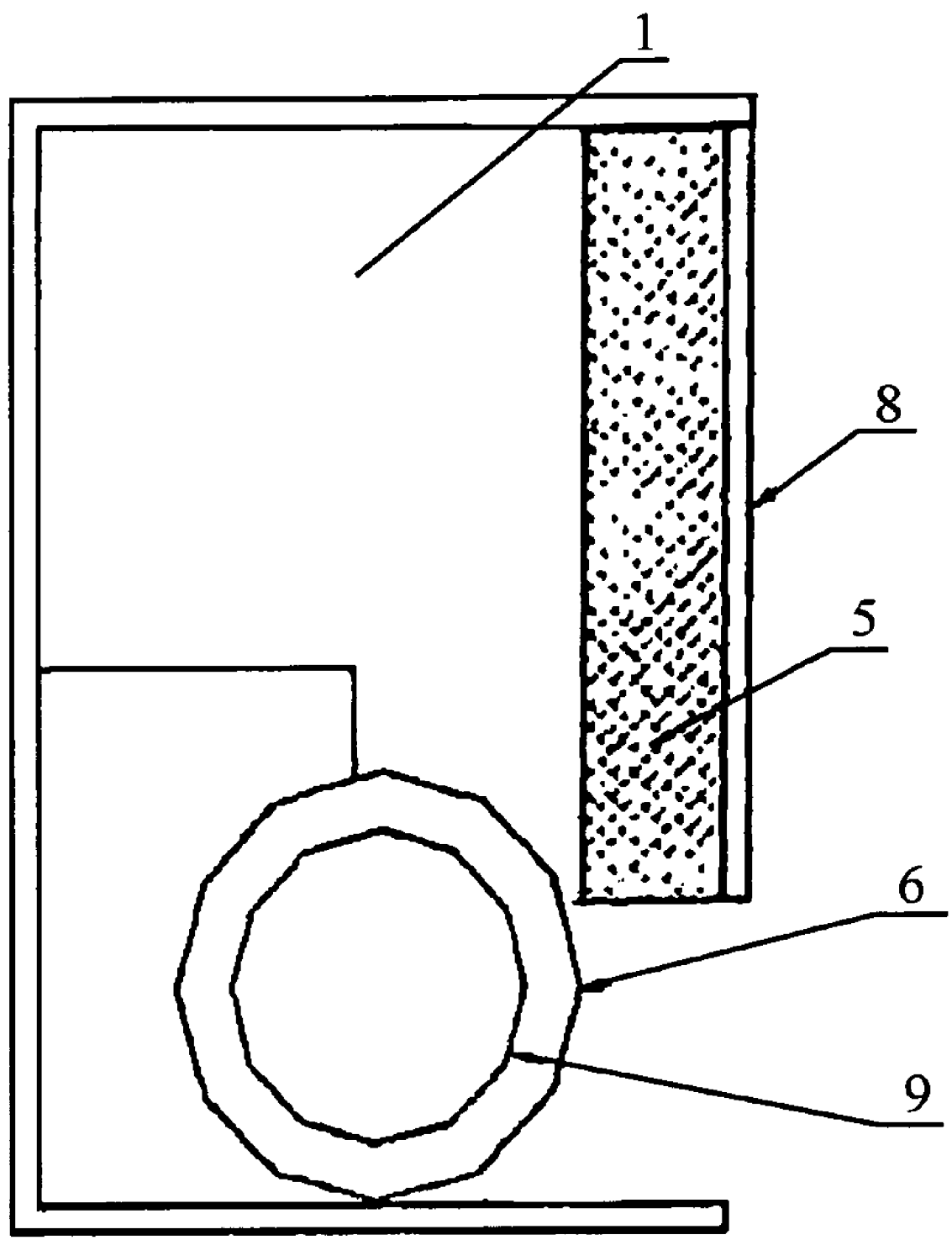
FIG. 1 is a partially sectional view of a conventional air conditioner.

As shown in FIGS. 1-3, the embodiment of the present invention has a conventional structure and function of a prior air conditioner, such as a filter 8, an evaporator 5, a cross-flow fan 6, a motor 9 and so on. When an auxiliary heating operation is required, the infrared tube 2 is initiated to emit an infrared radiation under the control of the controller 7. The infrared radiation is irradiated onto the evaporator 5 by the reflector 3, so as to achieve the auxiliary heating effect that the infrared tube 2 acts on the evaporator 5. As shown in FIG. 3, the motor 9 drives the cross-flow fan 6 to rotate under the control of the controller 7, so as to generate a negative pressure inside the air conditioner to thereby circulate air. Air outside the air conditioner is flown into the inner cavity of the air conditioner through the filter 8 and the evaporator 5. When air is flown across the evaporator, because the temperature of air is lower than that of the surface of the evaporator, heat exchange between air and the evaporator occurs so that the temperature of air increases. Then, the sterilized heated air is discharged through an air outlet to hereby fulfill auxiliary heating and sterilizing function of the light wave.

In other embodiments of the present invention, the reflector 3 can be formed as a mantle in the shape of a cone, a paraboloid or a polygon, while keeping rest parts the same as those in the first embodiment.

The invention claimed is:

1. An air conditioner having a light wave unit for auxiliary heating and sterilizing, comprising:
    a filter, an evaporator, a cross-flow fan and a motor,
    wherein the light wave unit for auxiliary heating and sterilizing comprises a light wave tube, a temperature sensor and a controller,
    the light wave tube being provided between the evaporator and the cross-flow fan, the temperature sensor being mounted on the evaporator, and an input port of the controller being coupled to a signal output port of the temperature sensor while an output port of the controller is coupled to a power input port of the light wave tube.

2. The air conditioner having a light wave unit for auxiliary heating and sterilizing of claim 1, wherein the light wave tube is an infrared tube.

3. The air conditioner having a light wave unit of claim 1, wherein a curved reflector is provided close to the light wave tube or the infrared tube so as to improve an auxiliary heating effect that the light wave tube or the infrared tube acts on the evaporator, the reflector having a center directly faces to the light wave tube or the infrared tube, a temperature sensor, of which a signal output port is coupled to an input port of the controller, is provided at a back surface of the reflector.

4. The air conditioner having a light wave unit of claim 3, wherein the reflector is a reflecting mantle having an arced shape, a round shape, a paraboloidal shape, a conical shape, or a polygonal shape.

5. The air conditioner having a light wave unit of claim 1, wherein the controller comprises a microprocessor MCU, a transistor Q1, a relay TR2, resistors R13, R4, R9, and a capacitor C8, which are coupled to I/O ports of the MCU; the transistor Q1, the relay TR2, and the resistor R13 composing a driving circuit, and an input port of the driving circuit being coupled to an I/O port of the MCU while an output port of the driving circuit is coupled to the light wave tube; signal output ports of the two temperature sensors are coupled to two I/O ports of the MCU, respectively.

6. The air conditioner having a light wave unit of claim 5, wherein the MCU is a multifunctional microprocessor with a type of TMP87PH46N.

7. The air conditioner having a light wave unit of claim 1, wherein the controller can be configured to be in an automatic mode or a manual mode.

8. The air conditioner having a light wave unit of claim 1, wherein the controller is configured to detect and protect the sterilization operation so as to control the temperature of the surface of both the reflector and the evaporator within a preset safe range.

9. The air conditioner having a light wave unit of claim 1, wherein the light wave tube is a light wave tube which can emit a visible light or an invisible light, and a heat-resistant power of the light wave tube is between 810 watt and 1500 watt.

10. The air conditioner having a light wave unit of claim 2, wherein a curved reflector is provided close to the light wave tube or the infrared tube so as to improve an auxiliary heating effect that the light wave tube or the infrared tube acts on the evaporator, the reflector having a center directly faces to the light wave tube or the infrared tube, a temperature sensor, of which a signal output port is coupled to an input port of the controller, is provided at a back surface of the reflector.

11. The air conditioner having a light wave unit of claim 2, wherein the controller comprises a microprocessor MCU, a transistor Q1, a relay TR2, resistors R13, R4, R9, and a capacitor C8, which are coupled to I/O ports of the MCU; the transistor Q1, the relay TR2, and the resistor R13 composing a driving circuit, and an input port of the driving circuit being coupled to an I/O port of the MCU while an output port of the driving circuit is coupled to the light wave tube; signal output ports of the two temperature sensors are coupled to two I/O ports of the MCU, respectively.

12. The air conditioner having a light wave unit of claim 2, wherein the controller can be configured to be in an automatic mode or a manual mode.

13. The air conditioner having a light wave unit of claim 2, wherein the controller is configured to detect and protect the sterilization operation so as to control the temperature of the surface of both the reflector and the evaporator within a preset safe range.

* * * * *